United States Patent [19]

Hums et al.

[11] 4,422,989

[45] Dec. 27, 1983

[54] METHOD OF PRODUCING HYDROTHERMALLY CURED AERATED CONCRETE BUILDING UNITS

[75] Inventors: Dieter Hums, Schrobenhausen; Armin Hartmann, Rheinau; Klaus F. Lippe, Aresing; Werner Wetzig, Messel, all of Fed. Rep. of Germany

[73] Assignee: Intong AB, Kumla, Sweden

[21] Appl. No.: 216,381

[22] Filed: Dec. 15, 1980

Related U.S. Application Data

[63] Continuation of Ser. No. 937,749, Aug. 29, 1978, abandoned.

[30] Foreign Application Priority Data

Aug. 31, 1977 [DE] Fed. Rep. of Germany ....... 2739181

[51] Int. Cl.³ ...................... C04B 15/04; C04B 31/02
[52] U.S. Cl. ........................ 264/42; 106/86; 106/87; 106/120; 264/333
[58] Field of Search ................. 264/42, 333; 106/77, 106/75, 76, 86, 89, 87, 120

[56] References Cited

U.S. PATENT DOCUMENTS

| | | | |
|---|---|---|---|
| 2,803,556 | 8/1957 | Carlsson et al. | 106/120 X |
| 3,808,299 | 4/1974 | Svensson | 264/42 |
| 4,067,939 | 1/1978 | Lowe | 264/42 |
| 4,135,940 | 1/1979 | Peltier | 264/42 X |
| 4,211,571 | 7/1980 | Hartmann et al. | 106/87 |
| 4,221,598 | 9/1980 | Doelinger | 106/87 |

FOREIGN PATENT DOCUMENTS

54-97622 8/1979 Japan ..................... 106/86

*Primary Examiner*—Philip Anderson
*Attorney, Agent, or Firm*—Larson and Taylor

[57] ABSTRACT

A method of producing gas concrete. Water, lime, cement and sand are pre-mixed. A calcium sulphate-containing component is subsequently mixed in and a rising agent is later admixed to form a castable mass suitable for making gas concrete by the conventional steps of pouring into a mold, permitting the mass to rise and harden sufficiently to be cut to size, and hydrothermally cured. By following the indicated procedure for making the castable mass, the calcium sulphate-containing component can be advantageously used.

3 Claims, No Drawings

METHOD OF PRODUCING HYDROTHERMALLY CURED AERATED CONCRETE BUILDING UNITS

This is a continuation of the application Ser. No. 937,749 filed Aug. 29, 1978 now abandoned.

The invention relates to a method of producing hydrothermally cured or aerated gas concrete building units by mixing a binding agent, consisting mainly of lime and cement, the lime content being predominant, sand, calcium sulphate, rising agent, preferably aluminum powder, and water to a mass suitable for casting, casting this mass into molds, leaving it to rise and harden, taking it out of the molds and cutting it, and curing the cut units hydrothermally.

In accordance with the invention, the lime which is used may be pulverized quicklime, preferably hard burnt pulverized quicklime and white pulverized lime and/or calcium hydrate, preferably hydrate of white pulverized lime. Soft burnt as well as hard burnt limes are suitable.

It is well known that the dimensions of hydraulically bound building units are a function of the moisture content. This also applies to gas concrete building units. Gas concrete usually comes out of the autoclave with a moisture content of about 30% by weight. This is water which is bound by adsorption. Depending on the temperature and moisture of the ambient air, an equilibrium moisture content, and thus a certain dimension, develops in the gas concrete building unit after having been built into a brickwork or after having been stored. The dimensions of the units after having been built-in are usually smaller in comparison to those of the moist building units when removed from the autoclave. The differences are not constant, but vary from make to make as they can also be influenced by e.g. the total raw material composition. The dimensions of, for example, the autoclave moist building units of approximately 30% by weight moisture content can be 0.01 to 0.06% bigger in relation to the dimensions which develop in an atmosphere of 40% relative humidity at 20° C. with approximately 3% moisture content in the building unit. These differences can vary, if the building unit is exposed to an atmosphere which contains $CO_2$. This dimensional change can bring about considerable inner stress in the building unit and formation of cracks.

It is therefore an object of the present invention to improve the dimensional stability and strength of gas concrete.

In accordance with the invention, the foregoing and other objects which will be apparent to those of ordinary skill in the art are achieved by a method as described above, characterized in that for producing the mass suitable for casting, a mixture of water, binding agent and sand is pre-mixed, then the calcium sulphate added and the mixing of the mass continued, then the rising agent is added and the mass is after-mixed to the desired consistency. By the mixing, a surprisingly favorable formation of the calcium hydrate and a particularly homogeneous distribution of the finely dispersed hydrate is achieved. It is advantageous if a mixture of 52 to 65%, or 55 to 60% by weight of lime in the binding agent, rest cement, is pre-mixed and 6 to 12%, or 8 to 10%, by weight $SO_3$ based on the CaO-content of the lime in the form of calcium sulphate is added to the pre-mixture. It is also possible to add larger quantities of calcium sulphate without the dimensional stability and the strength of the gas concrete units being influenced in a negative way. The quantity is determined empirically and depends, i.a., on the effect of the calcium sulphate in the rising and casting properties of the mass. It is more advantageous still if a mixture of 52 to 63% by weight of lime in the binding agent, rest cement, is pre-mixed and 6 to 12% by weight of $SO_3$ in the form of anhydrite is added to the pre-mixture.

In accordance with the method of the invention, water is first poured into the mixer and the mixer is started. The binding agent and sand are then added and pre-mixed for 40 to 80, preferably 50 to 70 seconds. After that, the $SO_3$-containing component, preferably the anhydrite, is added and the mixing is continued for approximately 30 to 35, preferably 32 to 34 seconds. The rising agent, preferably aluminum powder, is then added and the mass is after-mixed for 20 to 40, preferably 25 to 30 seconds. After mixing is completed, the mass may be retained in the mixing vessel until rising starts. For example, the mass may be retained in the mixing vessel for 8 to 14 seconds or for 10 to 12 seconds. The mass is then cast into molds.

The use of calcium sulphate in the indicated quantities for production of gas concrete from calcareous mixtures is not at all suggested in the prior art. From German Patent DT-PS No. 1,646,580, it is, e.g., known that it is possible to add calcium sulphate mainly in the form of the double hydrate gypsum or of the anhydrite to the green gas concrete mixtures to which the binding agent is added in the form of white pulverized lime. The addition serves to regulate the slaking velocity if a too rapid slaking of the white pulverized lime could reduce the quality of the gas concrete unit. The slaking of the lime is in this case to be adjusted exactly to the rising process. However, the addition of calcium sulphate considerably reduces the strength of a gas concrete building unit produced from a mixture containing mainly white pulverized lime as binding agent. For this reason, an addition of calcium sulphate was abandoned for gas concrete production without cement, and a lime, so called hard burned lime, was selected which is by nature adapted to the rising process due to its slaking behavior. Such special limes are, however, expensive. On the other hand, for mixtures with cement, the addition of calcium sulphate can be omitted since the slaking velocity of the lime can be retarded to a sufficient degree by the addition of cement.

It is also known from German Patent DT-PS No. 1,646,580 that the addition of calcium sulphate in an amount of more than 2.5% by weight $SO_3$ to mixtures rich in cement in which the cement content is more than 50% by weight in the binding agent, the strength which would be very poor without the addition of calcium sulphate depending on the content of cement—can be increased. Furthermore, it is known that the use of calcium sulphate in the production of gas concrete using mixtures which contain fly ash leads to an acceleration of the reaction between the lime and the fly ash.

On the contrary, it was surprising that the harmful effect of the calcium sulphate in calcareous mixtures can be eliminated in accordance with the invention and that it is even possible to produce gas concrete units of good dimensional stability.

Furthermore, in accordance with the invention, the strength of the gas concrete building units is not reduced, but rather increased, and the optic quality, particularly as far as the homogeneity of the color is concerned, is considerably improved. The following example will describe the invention more thoroughly.

In order to produce a gas concrete building unit of quality group G. 25 ("Quality group G 25" means material manufactured according to the German DIN standards having a minimum compressive strength of 25 kp/cm$^2$), 360 kg white pulverized quicklime (hard burnt of a CaO-content of 96% by weight) and 240 kg Portland cement PZ 350 and 1750 kg sand are put into a mixer, in which 1400 l water has already been poured. The mixer is started and the components are pre-mixed for 60 seconds. 50 kg calcium anhydrite of an SO$_3$-content of 59% b weight is then added to the pre-mixture and the mixing is continued for 32 seconds. Then 1.8 kg aluminum powder is added and the mass in after-mixed for 18 seconds. After the rising agent (aluminum powder) is thoroughly mixed in, the resulting slurry is poured into molds where the aluminum powder reacts with the alkaline water resulting in hydrogen bubbles which foam the material. The material rises and fills the originally partly filled molds completely. After a waiting time between 1 and 2 hours, the cast mass is cut with wires and conveyed into autoclaves in which it is hydrothermally cured by being subjected to steam of 10 atmospheres pressure for about 12 hours. After curing, a gas concrete building unit of a dimensional stability of 0.08 mm/m is obtained. the dimensional stability is determined by measuring the building unit immediately after autoclave curing and after 28 days exposure to an atmosphere of 40% relative air humidity at 20° C. at which an equilibrium moisture content of 3% by weight develops. The compressive strength of the lightweight concrete building unit is 35 kp/cm$^2$ and the visual quality is excellent.

It is particularly favorable if the method of producing gas concrete building units of quality group G 25 is carried out with water/solids ratios over 0.58. Preferably water/solids ratios of the castable mass is from 0.58 to 0.62. At the same time, it is advantageous if the lime content and the water/solids ratio are adjusted to each other in such a way that end temperatures of 75 to 90, preferably 80 to 85° C., develop in the rising mass. Thus, the mass becomes ready for cutting at the normal working rate and the dimensional stability of the ready units is influenced in a favorable way. Another advantage in this connection is the addition of as fine an aluminum powder as possible.

It is important that the casting stability of the mass cannot be guaranteed when using calcium sulphate, if the method parameters of the invention are not kept and the development of the hydrate of lime in the mixer is prevented by the presence of effective sulphate concentrations. For this reason, it is also advantageous if—according to a further development of the invention—the pre-mixing is done without the addition of cement and the cement is added to the pre-mixer together with the calcium sulphate or just before the addition of the calcium sulphate to the pre-mixture. This is recommended if cements of a high gypsum content are to be used. Furthermore, in this case, it is even possible to omit the calcium sulphate addition if the calcium sulphate content of the cement is sufficient to guarantee the desired dimensional stability.

Whereas an addition of gypsum generally reduces the rising speed as far as time is concerned in such a way that the rising process is retarded and leads to rejects, the method of the present invention makes the mass rise rapidly with an idea consistency especially so that reinforcements are well surrounded without any formation of cavities or "shadows". The working rates can be increased. Furthermore, less aluminum powder is required.

If sulphates are added in the beginning of the slaking process, the rising of the mass is very much retarded, i.e. very long periods of time are required until the mass has reached its rising maximum. This is, of course, unfavorable for production rate if the sulphate carrier is added at a suitable moment as described above, the mass rises very rapidly, practically in the same way as it would without the addition of any sulphate. The retarding effect of the sulphate does not begin until after the rising maximum has been reached, and this retarding effect shows itself mainly as a very slow continued increase of temperature.

In the production of reinforced units, an additional advantage of the present invention is thus achieved in that the quickly rising mass which has a low viscosity surrounds reinforcement bars as well, whereas if the masses are viscous and rising slowly, as is the case with high sulphate additions in the lime, cavities or "shadows" form behind the reinforcement bars in the rising direction.

What is claimed is:

1. In a method of producing gas concrete in which a mass comprising water, lime, rising agent, cement, and sand, said mass being suitable for production of gas concrete, is cast into a mold where it is permitted to rise and harden into a mass capable of being cut into a desired shape and wherein the hardened material is hydrothermally cured with steam in an autoclave to form a gas concrete product, the improvement wherein said castable mass is prepared by the steps of:
   providing water in a mixing vessel, adding lime, cement, and sand to the water in the mixing vessel while stirring and mixing for 40 to 80 seconds, said lime and cement together forming a binding agent in which the lime is predominant;
   mixing a calcium sulphate-containing component with said homogeneous pre-mixture for 30 to 35 seconds to form a homogeneous calcium sulphate-containing mixture, said calcium sulphate-containing component being selected from the group consisting of calcium sulphate anhydrite and gypsum and being present in an amount of 6–12% by weight SO$_3$ based on the weight of CaO in said lime;
   mixing a rising agent with said homogeneous calcium sulphate-containing mixture for 20 to 40 seconds to form said castable mass; and
   after mixing is completed, retaining the castable mass in the mixing vessel until rising starts.

2. A method according to claim 1 wherein the castable mass is retained in the mixing vessel for 8 to 14 seconds.

3. In a method of producing gas concrete in which a mass comprising water, lime, rising agent, cement, and sand, said mass being suitable for production of gas concrete, is cast into a mold where it is permitted to rise and harden into a mass capable of being cut into a desired shape and wherein the hardened material is hydrothermally cured with steam in an autoclave to form a gas concrete product, the improvement wherein said castable mass is prepared by the steps of:
   pre-mixing water, lime, cement, and sand to form a homogeneous pre-mixture, said lime and cement together forming a binding agent in which the lime is predominant;

mixing a calcium sulphate-containing component with said homogeneous pre-mixture to form a homogeneous calcium sulphate-containing mixture, said calcium sulphate-containing component being selected from the group consisting of calcium sulphate anhydrite and gypsum and being present in an amount of 6–12% by weight $SO_3$ based on the weight of CaO in said lime;

mixing a rising agent with said homogeneous calcium sulphate-containing mixture to form said castable mass; and retaining the castable mass in the mixing vessel for 8 to 14 seconds.

* * * * *